(12) United States Patent
Tsai et al.

(10) Patent No.: US 10,841,525 B1
(45) Date of Patent: Nov. 17, 2020

(54) IMAGE DATA READOUT CIRCUIT WITH SHARED DATA BUS

(71) Applicant: OmniVision Technologies, Inc., Santa Clara, CA (US)

(72) Inventors: Chao-Fang Tsai, San Jose, CA (US); Chun-Hsiang Chang, San Jose, CA (US); Zejian Wang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/549,537

(22) Filed: Aug. 23, 2019

(51) Int. Cl.
| | |
|---|---|
| *H04N 5/374* | (2011.01) |
| *H04N 5/378* | (2011.01) |
| *H04N 5/376* | (2011.01) |
| *H04N 5/372* | (2011.01) |
| *G11C 7/16* | (2006.01) |
| *G11C 7/18* | (2006.01) |
| *G11C 7/10* | (2006.01) |
| *G11C 7/22* | (2006.01) |

(52) U.S. Cl.
CPC ............ *H04N 5/378* (2013.01); *H04N 5/374* (2013.01)

(58) Field of Classification Search
CPC .. H04N 5/3452; H04N 5/37213; H04N 5/374; H04N 5/3742; H04N 5/3745; H04N 5/37455; H04N 5/37457; H04N 5/376; H04N 5/3765; H04N 5/378; H04N 5/23267; H04N 5/2327; G11C 7/106; G11C 7/16; G11C 7/18; G11C 7/22; G11C 7/222; G11C 7/1018; G11C 8/08; G11C 8/14; G11C 19/00; G11C 2216/30; H03M 1/001

USPC .... 348/308, 208.6, 316, 319, 321, 323, 294, 348/297; 341/187, 108, 110, 126, 144, 341/155–172; 327/241, 210, 389, 391, 327/433, 434, 437; 250/208.1; 257/291, 257/292, 443, 232

See application file for complete search history.

(56) References Cited

U.S. PATENT DOCUMENTS

| | | | | |
|---|---|---|---|---|
| 6,707,411 | B1* | 3/2004 | Poulton .................... | G11C 7/16 341/155 |
| 9,848,141 | B2* | 12/2017 | Panicacci ............. | H04N 5/3292 348/250 |
| 10,110,837 | B2* | 10/2018 | Lin ....................... | H04N 5/3577 |
| 10,129,496 | B2* | 11/2018 | Hagihara ............... | H04N 5/378 348/302 |
| 2006/0220939 | A1* | 10/2006 | Kirsch ................. | H04N 5/3742 341/155 |
| 2009/0052362 | A1* | 2/2009 | Nii ........................ | G11C 11/412 365/189.14 |

(Continued)

*Primary Examiner* — Marly S Camargo (57) ABSTRACT

Apparatuses and methods for data transmission in an image sensor are disclosed herein. An example data transmission circuit may include a plurality of transmission banks coupled in series with a first one of the plurality of transmission banks coupled to function logic, where each of the plurality of transmission banks are coupled to provide image data to a subsequent transmission bank in a direction toward the function logic in response to a clock signal, a plurality of delays coupled in series, wherein each of the plurality of delays is associated with and coupled to a respective transmission bank of the plurality of transmission banks, and wherein the clock signal is received by each of the plurality of transmission banks after being delayed by a respective number of delays of the plurality of delays in relation to the function logic.

24 Claims, 5 Drawing Sheets

(56) References Cited

U.S. PATENT DOCUMENTS

| | | | |
|---|---|---|---|
| 2009/0085616 A1* | 4/2009 | Wada | H03K 5/135 327/155 |
| 2010/0276572 A1* | 11/2010 | Iwabuchi | H01L 23/481 250/208.1 |
| 2011/0002179 A1* | 1/2011 | Kim | G11C 11/4076 365/230.03 |
| 2015/0304583 A1* | 10/2015 | Lee | H04N 5/378 348/300 |

* cited by examiner

IMAGE DATA READOUT CIRCUIT WITH SHARED DATA BUS

TECHNICAL FIELD

This disclosure relates generally to image sensors, and in particular but not exclusively, relates to data transmission in an image sensor.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

Many mobile devices, such as smartphones, have begun to introduce multiple antennae for the wireless transmission and reception. However, in some instances, one or more of the additional antennae may be placed in close proximity to an integrated image sensor. In general, the proximity of the antennae and the image sensor may be a non-issue, but due to certain operations, electromagnetic interference (EMI) generated in the antennae may be due to the image sensor. For example, the EMI may be due to large switching operations that occur in the image sensor due to movement of data from the pixel array to processing logic. As such, reduction or elimination of the EMI may be desirable.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for data transmission within an image sensor are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1:
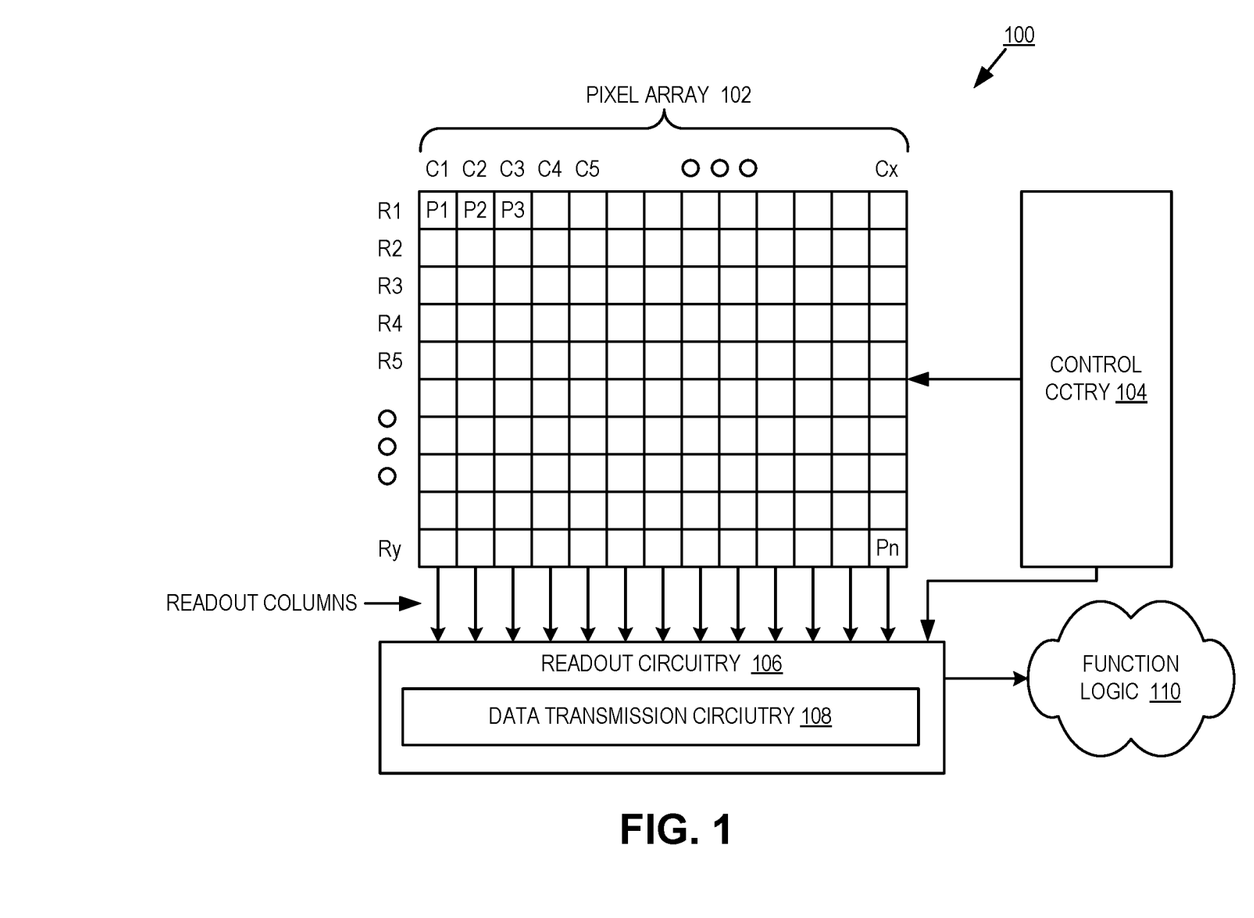
FIG. 1 illustrates one example of an imaging system 100 in accordance with an embodiment of the present disclosure.

FIG. 1 illustrates one example of an imaging system 100 in accordance with an embodiment of the present disclosure. Imaging system 100 includes pixel array 102, control circuitry 104, readout circuitry 106, and function logic 110. In one example, pixel array 102 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 102 has acquired its image data or image charge, the image data is readout by readout circuitry 106 and then transferred to function logic 110. Readout circuitry 106 may be coupled to readout image data from the plurality of photodiodes in pixel array 102. In various examples, readout circuitry 106 may include amplification circuitry, analog-to-digital (ADC) conversion circuitry, and data transmission circuitry 108. Function logic 110 may simply store the image data or even manipulate the image data by applying post image effects (e.g., crop, rotate, remove red eye, adjust brightness, adjust contrast, or otherwise). In some examples, control circuitry 104 and function logic 110 may be combined into a single functional block, and may control the capture of images along with the readout of image data from the readout circuitry 106 to the function logic 110. The function logic 110 may be a digital processor and some memories associated with it, for example. In one example, readout circuitry 106 may readout a row of image data at a time along readout column lines (illustrated) or may readout the image data using a variety of other techniques (not illustrated), such as a serial readout or a full parallel readout of all pixels simultaneously.

In one example, control circuitry 104 is coupled to pixel array 102 to control operation of the plurality of photodiodes in pixel array 102. For example, control circuitry 104 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

In one example, data transmission circuitry 108 may receive image data from ADCs, which convert the image data into digital representations of the same, and provide the digital representation of the image data to the function logic 110. In some embodiments, the data transmission circuitry 108 may receive the digital representations of the image data from the ADCs in parallel, and provide the same to the function logic 110 in series. The digital representations of the image data may be data words ranging from 11 to 15 bits, with 9 to 12 bits being associated with the image data and the remaining bits (two to three bits) being reserved for error correction. The error correction may be generated using any known error correction code (ECC), such as Hamming code, Reed-Solomon code, etc.

The image data received by the data transmission circuit 108 may comprise a row of data, less than a row of data, or more than a row of data, which may then be provided to the function logic 110 in series, as noted. However, instead of conventional data transmission techniques that provide the data over one or more conductors that have been precharged to a high logic level, for example, the data transmission circuitry 108 may comprise a plurality of banks configured to receive the image data in parallel, then provide their data sequentially to adjacent banks in a direction toward the function logic 110. The data may propagate through a series of latches that couple adjacent banks, and with the propagations controlled by a common clock signal. The common clock signal may be delayed an amount respective to the bank in relation to the function logic 110. As such, instead of each latch of each of the plurality of banks operating simultaneously, each latch may operate one after another, such as in a wave-like pattern. The wave-like pattern and free of precharge may reduce current load and electromagnetic interference (EMI) generation.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
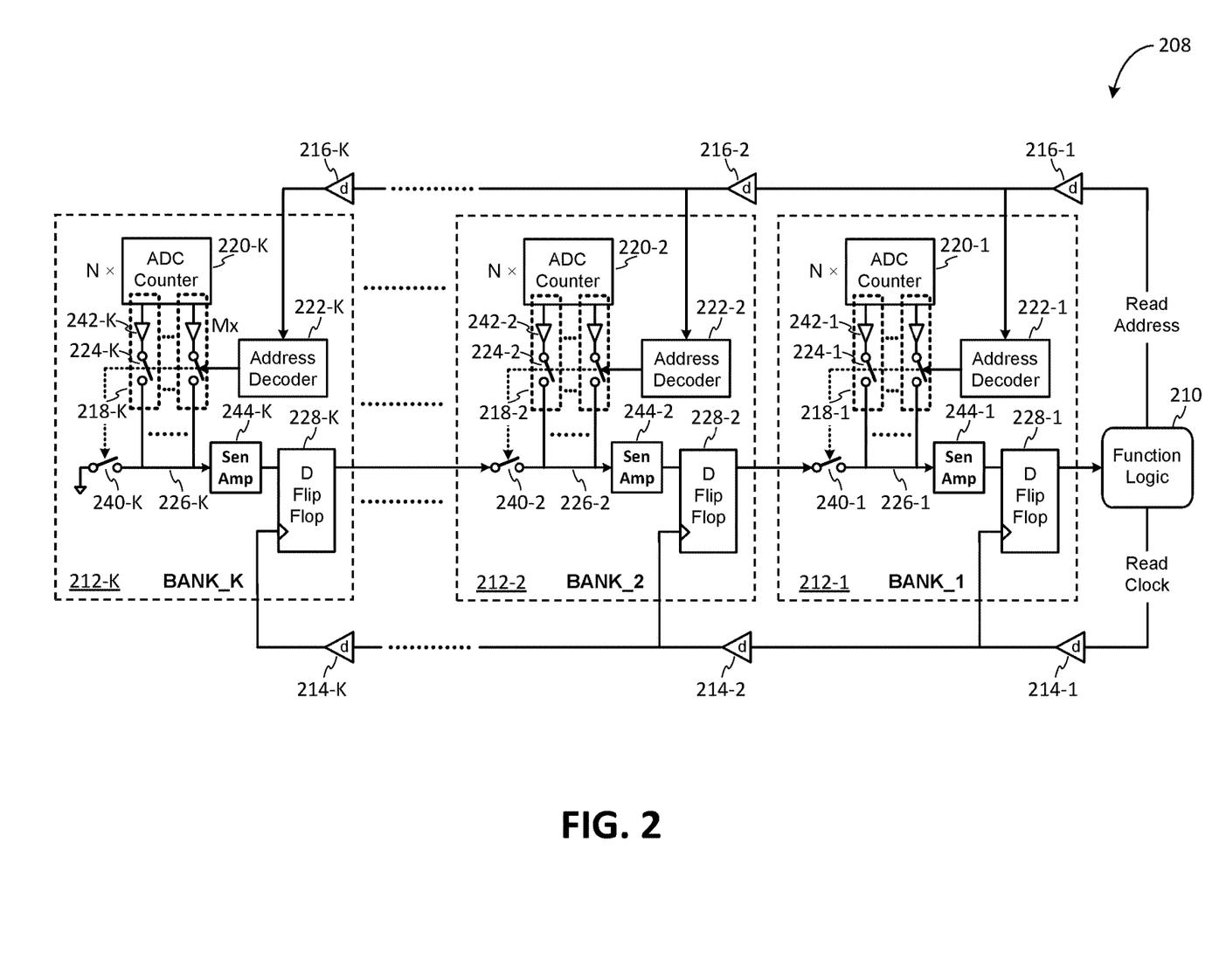
FIG. 2 is a data transmission circuit 208 in accordance with an embodiment of the present disclosure.

FIG. 2 is a data transmission circuit 208 in accordance with an embodiment of the present disclosure. The data transmission circuit 208 may be an example of the data transmission circuitry 108. The data transmission circuit 208 may receive image data from a pixel array, such as the pixel array 102, and serially provide the image data in turn. In some embodiments, the image data received by the data transmission circuit 208 may be in analog form, but the image data provided by the data transmission circuit 208 may be in digital form, e.g., data words representing image data from each pixel. However, the data transmission circuit 208 may otherwise receive the digital versions of the image data and provide the same in response. In some embodiments, the image data, e.g., the digital version, may be provided to function logic 210. Function logic 210 may be an example of the function logic 110 or a combination of the control circuitry 104 and the function logic 110.

The illustrated embodiment of the data transmission circuit 208 includes a plurality of banks 212 coupled to function logic 210, which provides a read clock and a read address to the plurality of banks 212 via a plurality of delays 214 and 216, respectively. In some embodiments, there may be K number of banks, such as banks 212-1 through 212-K. For example, K may be 8 or 16, but other numbers of banks are also contemplated. The K banks may be coupled in series with a first one of the banks coupled to function logic 210. In general, image data may propagate through the plurality of banks to the function logic 210. In some embodiments, image data from bank 212-1, e.g., bank_1, may be provided to the function logic 210 first sequentially followed by data from banks 212-2 through 212-K, e.g., bank_2 through bank_K. Other than bank 212-1, data from each other bank 212 may propagate through all other interstitial banks 212 between it and the function logic 210. For example, image data from bank 212-K may propagate through banks 212-(K−1) through 212-1 before reaching function logic 210.

The illustrated embodiment of a bank 212 includes a plurality of channels 218, an address decoder 222, and a plurality of ADC counters (e.g. binary ripple counter, Gray-Code counter) 220 that maintain the digital value of the ADC once latched. In some embodiments, there may be N ADC counters 220 and M channels 218, where the N represents the number of pixels the bank may receive image data from, and the M represents the number of channels. For each bank 212 there may be 8 or 16 channels, but other numbers of channel are contemplated herein. Image data of each bank 212 may be provided to a subsequent downstream bank 212 in response to at least the clock signal. As used herein, downstream may refer to movement of data toward the function logic 210. Because the plurality of banks 212 is coupled in series, image data propagates from an initial bank 212 through each interstitial bank 212 between it and the function logic 210. The propagation of the image data may be from one of the plurality of channels 218 connected to a word bus 226 through the respective channel switch 224 to a subsequent downstream interface D flip-flop 228. The image data may move in a series of hops from interface D flip-flop 228 to interface D flip-flop 228 in response to a series of read clock signals.

The plurality of ADC counters 220 for each bank 212 may be or include ADC converters of associated readout circuitry, such as readout circuitry 106. While the ADC counters 220 are shown as part of the plurality of banks 212, the depiction is for ease of discussion and different implementations may be possible. For each bank 212, the plurality of ADC counters 220 may be a number N, so that each bank 212 receives image data from N pixels. In some embodiments, the summation of N ADC counters 220 for each bank 212 may equal a row of pixels of a pixel array, such as the pixel array 102. Each ADC counter 220 may convert image data received from a pixel into a digital representation of the same. For example, each ADC counter 220 may convert an analog voltage into a digital data word. The data word may be 9 bits or more, depends on application, to represent the image data, and 2 to 3 ECC bits may be appended after one or more ECC operations. As used herein, image data may be used to refer both to the analog and digital form, for sake of brevity.

The address decoder 222 may receive a delayed read address and provide a channel switch control signal and a bank switch control signal in response. In some embodiments, the channel switch control signal is provided to determine which channel of the plurality of channels 218 is responsible to provide the image data of the preset bank 212 to the interface D flip-flop 228. In some embodiments, the read address determines a sequence of providing the N image data to the function logic 210. Additionally, the channel switch control signal controls a channel switch 224 of each channel 218, which may cause the image data to be provided sequentially to the word bus 226 through each channel 218. In some embodiments, the read address may include up to nine bits, with a portion of the bits used to determine image data associated with which one of the plurality of channels 218 to be transmitted, and the remaining bits of the read address to control a bank switch 240.

As will be discussed below, in an example, when all the image data of the present bank $212\_i$ (i=2, . . . , K−1 bank) have been transmitted to the downstream adjacent bank $212\_i$−1, word bus $226\_i$ is released for inter-bank transmission use in a time shared fashion or a mutually exclusive way, channel switch $224\_i$ is turned off and bank switch $240\_i$ turned on to enable connection between and image data from the upstream adjacent bank $212\_i$+1 and the word bus $226\_i$ of the present bank $212\_i$. As used herein, downstream would refer to directions toward the function logic 210, and upstream would refer to directions away from the function logic 210.

The illustrated embodiment of each of the plurality of channels 218 may include channel image data stored (data is maintained once latched) in one or more of the plurality of the ADC counters 220, a channel buffer 242, and channel switch 218. The ADC counters 220 may be coupled to the channel switch 218 directly or through the channel buffer 242. The channel buffer 242 may be implemented between the ADC counters 220 and the channel switch 218 to isolate the ADC counters 220 from the word bus 220 down the data stream, and to enhance transmission speed to overcome the large parasitic capacitance presented on the word bus 226 which may be caused by the multiple channel switches 218 and bank switches 240.

Image data from other ADC counters 220 of a bank 212 may take turns to go through respective channels 218 during a data transmission process of the present bank 212. In some embodiments, each channel 218 of the plurality of channels 218 may transmit a plurality of data words, with each data word representing image data from each pixel, to the word bus 226 in response to a read address decoded by the address decoder 222. Channels 218 associated to each bank may be accessed one at a time in series.

The word bus 226 may receive a plurality of data words through channel switch 224 from one or more of the plurality of ADC counters 220 in response to the channel switch control signal from the address counter 220. The data words representing the image data on the word bus may be coupled to the interface D flip-flop 228 either directly or through a sense amplifier 244. The sense amplifier 244 may be implemented between the word bus 226 and the interface D flip-flop 228 to enhance transmission speed to overcome the large parasitic capacitance on the word bus 226 caused by the multiple channel switches 218, bank switches 240, and other capacitance loads so introduced by the switches.

The word bus 226 may be coupled to the channel image data from channels 218 and/or an output of an upstream interface D flip-flop 228. The interface D flip-flop 228 is coupled to latch image data from any associated channel 218 or from an upstream bank 212 in response to a read clock signal. Once the image data is latched by the interface D flip-flop 228, the image data is ready to be provided to a downstream bank switch 240.

Additionally, each bank 212 receives the read clock and the read address signals via a plurality of delays 214 and 216, respectively. For example, bank 212-1 receives the read address after being delayed a single time by delay 216-1, whereas bank_K receives the read address after being delayed K times due to delays 216-1 through 216-K. The same is true for the read clock signal. In general, the delay of each delay 214 and 216 may be very small, at least compared to a clock period. In some embodiments, the delay of each delay 214 and 216 may be a period of a system clock (not shown) divided by the number of banks 212, e.g., K. Delaying at least the read clock signal, accordingly, allows each interface D flip-flop 228-1 through 228-K to latch data sequential instead of all at the same time. By sequentially triggering each interface D flip-flop 228, the peak current is spread out and reduced, which helps to reduce peak power consumption. Additionally, triggering the interface D flip-flops 228 as such reduces the generation of electromagnetic interference (EMI), since each of them are not triggered concurrently.

In operation, the function logic 210, or the control circuitry 104, provides a read address signal and a read clock signal to the data transmission 208. In some embodiments, the two signals are provided concurrently. In other embodiments, the read address signal may be provided prior to the read clock signal so that the image data associated with the read address is ready before the read clock signal arrives to latch. In response to the read address and read clock signals, one or more of the banks 212 provides image data to the function logic 210 via intervening bank 212. For example, if a channel 218 of bank 212-4 is targeted by the read address, then the image data may propagate to the function logic 210 via banks 212-3, 212-2, and 212-1 before arriving at the function logic 210. To move the data between banks 212, subsequent pulses of the read clock signal will trigger the movement of the image data from bank 212 to bank 212. Additionally, the read address signal received by the banks 212 may cause the banks 212 not to enable their bank switches 240 to provide data passage from an upstream bank 212 to the associated interface D flip-flop 228.

In some examples, each bank 212, e.g., 212-1 through 212-K, may direct one of the plurality of the channel image data to a respective interface D flip-flop 228. Once the local (bank) data is latched by the respective interface D flip-flop 228, the local data may propagate to a subsequent downstream interface D flip-flop 228 via a subsequent pulse of the read clock signal. To move all K banks of image data into the function logic 210, K clock signals may be required.

Figure 3:
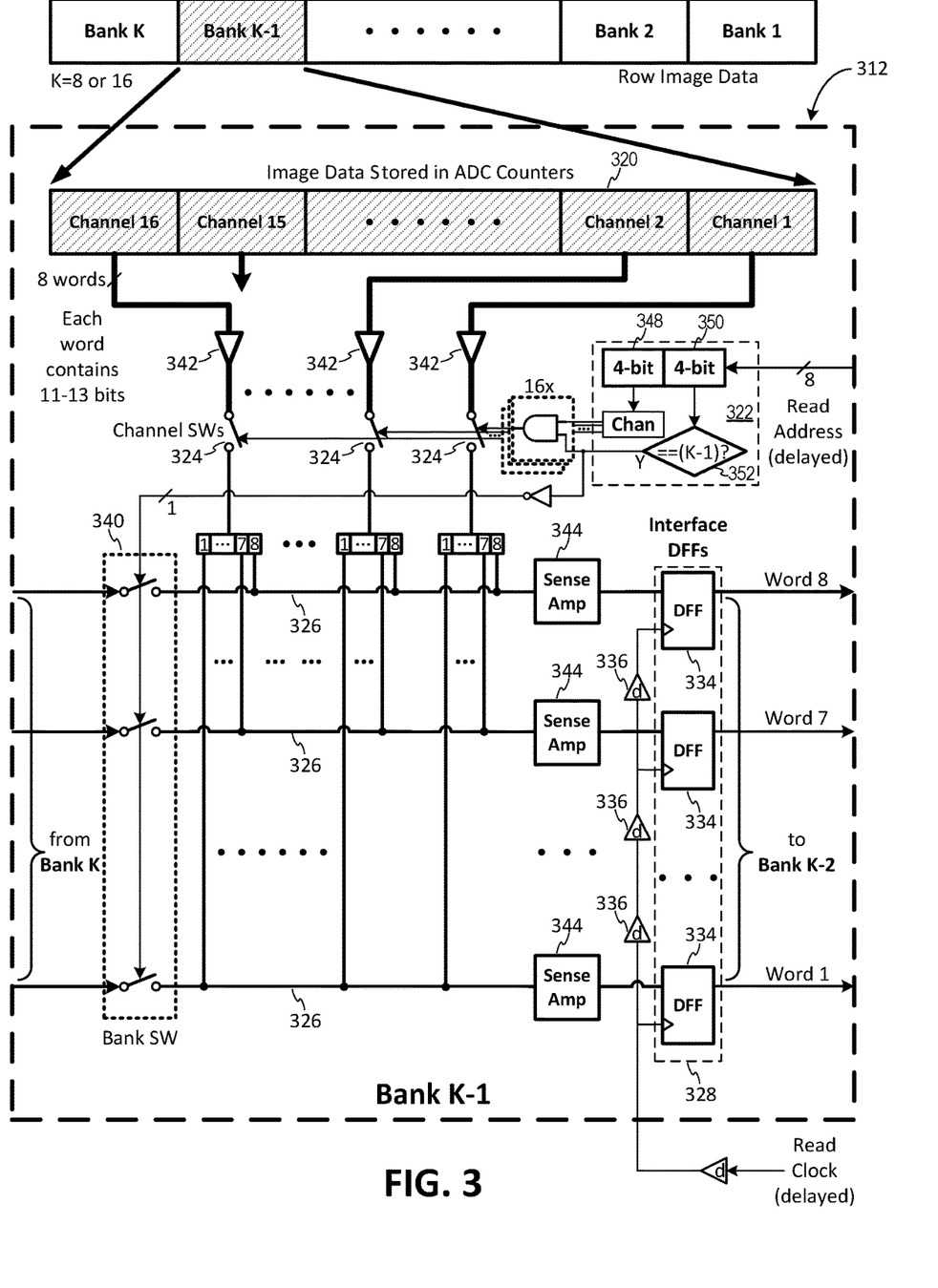
FIG. 3 is a block diagram of a bank 312 in accordance with an embodiment of the present disclosure.

FIG. 3 is a block diagram of a bank 312 in accordance with an embodiment of the present disclosure. The bank 312 may be but one example of a bank 212 of the data transmission circuit 208. The illustrated embodiment of the bank 312 includes ADC counters (e.g. binary ripple counter or Gray-code counter) 320, an address decoder 322, a channel buffers 342, channel switches 324, a word bus 326, interface D flip-flop (labeled Interface DFFs in FIG. 3) 328, a plurality of delays 336, a bank switch 340, and sense amplifiers 344, and where the bank 312 is bank_K−1 of K banks, as shown at the top of FIG. 3. The bank 312 may have a plurality of channels, such as 8 or 16. The illustrated embodiment of the channel includes a fraction of the ADC counters 320, the channel buffer 342, and the channel switch 324. Both the channel switches 324 and the sense amplifiers 344 may be implemented as options. They may be used to enhance the transmission speed. Both the channel switches 324 and a bank switch 340 may be made of conventional solid state transistors or transmission gates. The illustrated embodiment of the interface DFF 328 includes a plurality of DFFs 334.

The illustrated embodiment of the ADC counters 320 is shown as a block that includes 16 channels, with each channel including eight data words. Of course, the numbers of channels and data words are for example purposes only, and should not be considered limiting to the present disclosure. The ADC counter 320 may be an example of the ADC counter 220, and may receive analog image data from a pixel, or a plurality of pixels and provide digital image data in response. In the embodiment of FIG. 3, each of the 16 channels may include 8 data words. The data words may be 11- to 15-bit data words, with 8 to 12 bits used for image data, and the remaining bits used for error correction like the ECC. The eight data words outputs of each channel of the ADC counter 320 may be coupled to the word bus 326 through the optional channel buffer 342, and the channel switch 324.

The channel switches 324 may be coupled to provide data words from one of the 16 channels of the ADC counters 320 to the word bus 326 in response to the channel switch control signal. The channel switch control signal may be provided by the address decoder 322, for example. The channel switch from one of the 16 channels may asynchronously provide, in one embodiment, the 8 data words of the selected channel to the word bus 326 in response to the channel switch control signal in a sequential fashion, one channel at a time, from channel 1 to channel 16.

The address decoder 322 may receive a read address from a control circuit or function logic 210, and provide the image data associated with the read address in response. The read address may be delayed a respective amount of delay in accordance with a relation of the bank 312 to the function logic, such as function logic 110 and/or 210. For example, bank_K−1 of FIG. 3 will receive the read address after being delayed by K−1 delays. In some embodiments, the read address may be an eight-bit word, with four bits used to determine a target channel of the ADC counter 320, and the other four bits used to determine a target bank of the transmission circuit 208. If the present bank is the target bank, the bank switch 340 of the present bank is turned off and one channel switch 324 of the target channel is turned on to couple the channel image data to the interface DFFs 328 via the word bus 326. If the present bank is not the target bank, the channel switches 324 of all the channels, regardless whether or not a target channel, is turned off, therefore all 16 channel image data are decoupled (or excluded) from the word bus 326, and the bank switch 340 of the present bank is turned on to couple the image data from the upstream bank 312 to the interface DFFs 328 of the present bank 312 via the shared word bus 326. The word bus 326 can be time shared this way by the channel image data of the present bank and image data from the upstream banks 312 because the two different data mutually exclude each other from occupying the word bus 326 during the same time period.

The address decoder 322 may include two four-bit decoders 348 and 350, and a logic gate 352. The two four-bit decoders 348 and 350 may decode a different part of the read address and provide respective control signals in response. For example, the four-bit decoder 348 may determine which of the 16 channels to couple to the word bus 326, e.g., how to control each channel switches 324, one at a time, and the four-bit decoder 350 may determine whether all the channel image data of the present bank to be decoupled (or excluded) and the output of a subsequent upstream bank to be allowed to couple to the word bus 326. While the logic gate 352 is shown as a flow chart-type decision block in FIG. 3, any type of logic gate may be implemented, such as an OR, AND, XOR, XNOR, etc. The logic gate 352 may receive the output of the four-bit decoder 350 and determine whether the output equals the address of the present bank 312, e.g., bank_K−1.

In some embodiments, there may be eight data words in each channel and 8 to 13 bits in each data word, but the number of words and/or bits should not be considered limiting.

In some embodiments, the number of the Interface DFFs 328 may depend on the number of words provided by each channel of the ADC counters 320. For example, there may be eight data words coupled to the eight interface DFFs 334 via the word bus 326.

The Interface DFFs 328 may be coupled to receive data words at a plurality of inputs, latch and provide the same in response to the read clock signal. In some embodiments, the Interface DFFs 328 may be formed from a plurality of D flip-flops 334. In general, the number of D flip-flops may be commensurate with a number of data words received as inputs. For example, to receive eight data words, there may be eight D flip-flops 334. Outputs of the interface D flip-flop 328 may be coupled to a bank switch 340 of a subsequent downstream bank, for example. However, the outputs of the Interface DFFs 328 of a bank_1 may be coupled to an input of a logic function, such as logic function 110/210.

The plurality of delay 336 may further delay the read clock signal, and may be coupled to trigger a respective D flip-flop 334. For example, seven delays may be implemented with each of the seven delays coupled between instances of D flip-flops 334. By further delaying the read clock signal, each data word from a channel is latched in a cascade-like manner so that each of the D flip-flops do not trigger simultaneously. In some embodiments, data word 1 may be latched first followed by data word 2, then data word 3, and so on until all eight data words are latched.

Figure 4:
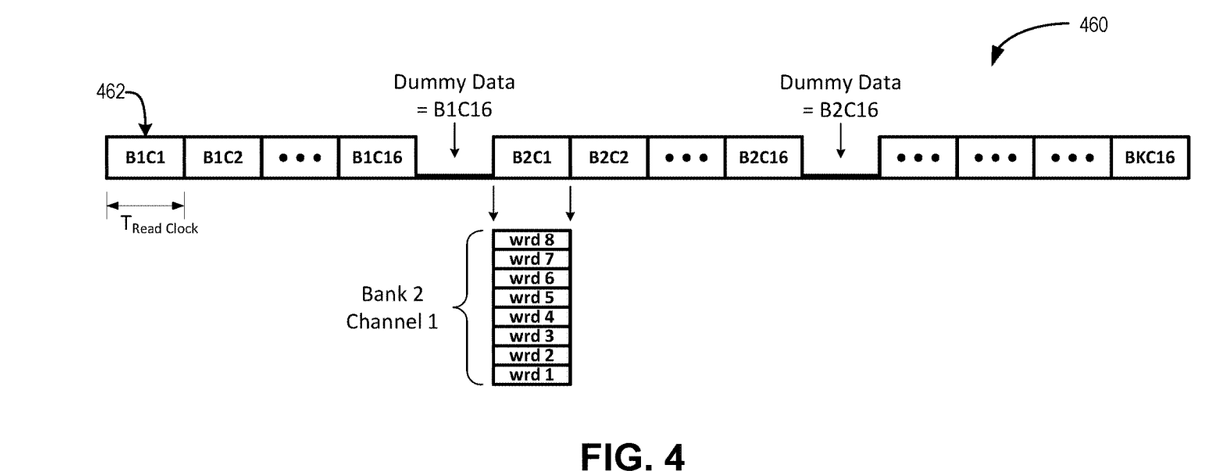
FIG. 4 is an example timing diagram 460 in accordance with an embodiment of the present disclosure.

FIG. 4 is an example timing diagram 460 in accordance with an embodiment of the present disclosure. The timing diagram 460 may represent data movement through the data transmission circuits 108 and/or 208. The timing diagram 460 includes a plurality of data blocks 462, with each data block 462 representing eight data words from a single channel of a single bank. For example, the data block 462 labeled "B1C1," e.g., bank_1 Channel 1, represents 8 data words from channel 1 of Bank_1. Additionally, between each bank a dummy data block may be included. For example, after B1C16, e.g., bank_1 Channel 16, a dummy data block may be included. In some embodiments, the dummy data block may be a replica of the previous data block, such as B1C16. However, any dummy data may be implemented and is contemplated herein. Additionally, the 8 data words forming each data block 462 may have an associated sequence. For example, the 8 data words may be transmitted in order starting with data word 1, then data word 2, and so on.

Function logic and/or control circuitry of an imaging system may receive the data represented in the timing diagram 460. In some embodiments, the data may be received sequentially channel by channel and bank by bank. While the order of the banks may not change from receiving data from bank_1 first then bank_2 and on until bank_K data is received, the order of the channels of each bank may be different. The order of the channel data within each bank data may be provided in response to the read address provided by the digital processor. In general, the sequence of not only the banks, channels within the banks, and data words within each channel may depend on the order of read addresses provided by control circuitry or function logic.

Each data block may take a clock period to be received by the function logic. For example, the clock period may be $T_{Read\ Clock}$, which may be a period of the read clock signal. In some embodiments, the read clock signal may be a derivative of a system clock signal. With reference to FIG. 3, 8 data words of a single channel may be clocked into the digital processor in a single clock period once those eight data words have propagated to the interface DFF 328 of bank_1. However, the number of clock cycles of any given channel needed to clock the 8 data words into the function logic will depend on the bank from which they originate and that bank's relation to the function logic. This may be so since the banks are serially coupled with bank_1 directly coupled to the function logic and the remaining banks a respective number of banks away from the digital processor. For example, image data from bank_5 may take 5 periods of $T_{Read\ Clock}$ to be received by the function logic, and image data from bank_(K−2) may take (K−2) period of $T_{Read\ Clock}$.

Figure 5:
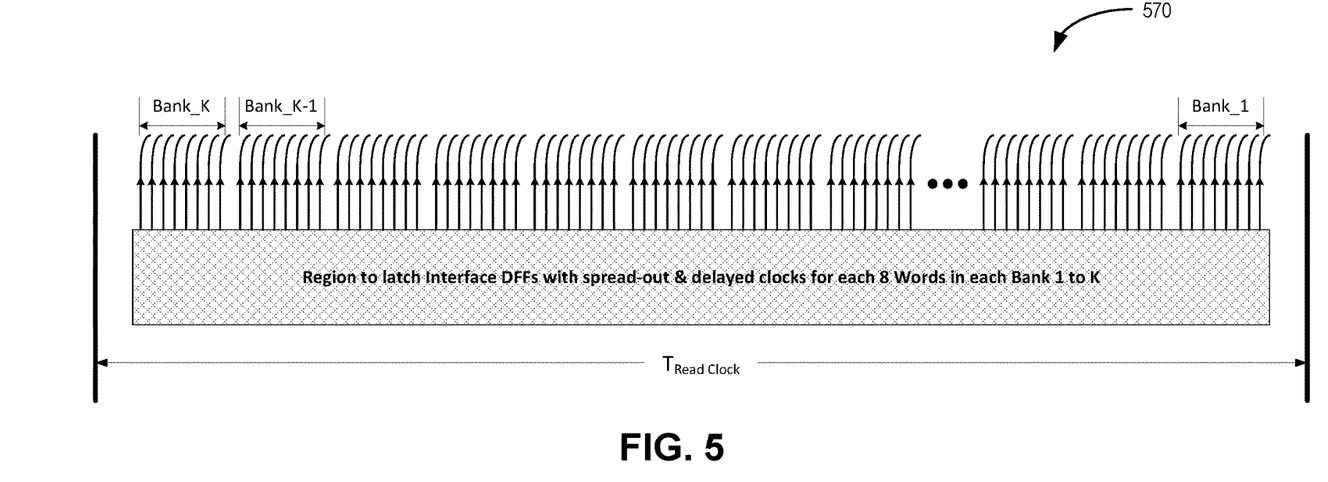
FIG. 5 is an example timing diagram 570 in accordance with an embodiment of the present disclosure.

FIG. 5 is an example timing diagram 570 in accordance with an embodiment of the present disclosure. The timing diagram 570 shows the rising edge of the read clock signal provided to D flip-flops 334, for example, to K banks of a data transmission circuit. The read clock signal may be distributed to each bank and to each D flip-flop 334 of each bank through delays to spread out the triggering and switching of 8 D flip-flops 334 times K banks. Spreading out the triggering and latching may reduce peak current and power, which may result in a reduction in overall power consumption. Additionally, the distributed switching may reduce EMI generation due to a large number of small switching events instead of a large number of switching events simultaneously occurring.

The rising edge of the distributed read clock signal may result in latching of data words by interface DFFs 228/328 of the data transmission circuit. Each arrowed line shown in the timing diagram 570 represents a rising edge of a read clock signal distributed through a data transmission circuit via a plurality of delays. The read clock signal may originate at function logic or control circuitry of an imaging system. In terms of sequence, the read clock signal may be provided to Bank_1 before sequentially propagating to each of the Banks 2 through K through a respective number of delays. Additionally, each rising edge of the read clock signal may be delayed within each bank so that interface DFFs 334 are each triggered sequentially. As a result, there is a cascade of data words latched by respective interface DFFs 334.

Additionally, the timing diagram 570 shows a single read clock period $T_{Read\ Clock}$. In some embodiments, to ensure that each interface D flip-flop 328 (including the DFFs 334) of the K banks latches image data within a single clock period, the delay of each delay may be $T_{Read\ Clock}$ divided by (K*8), where 8 represents the number of D flip-flops 334 that form an interface D flip-flop 328. This is to ensure that all image data of all K banks is latched in a single period of the read clock before the data serially propagates through the data transmission circuit to the function logic.

Figure 6:
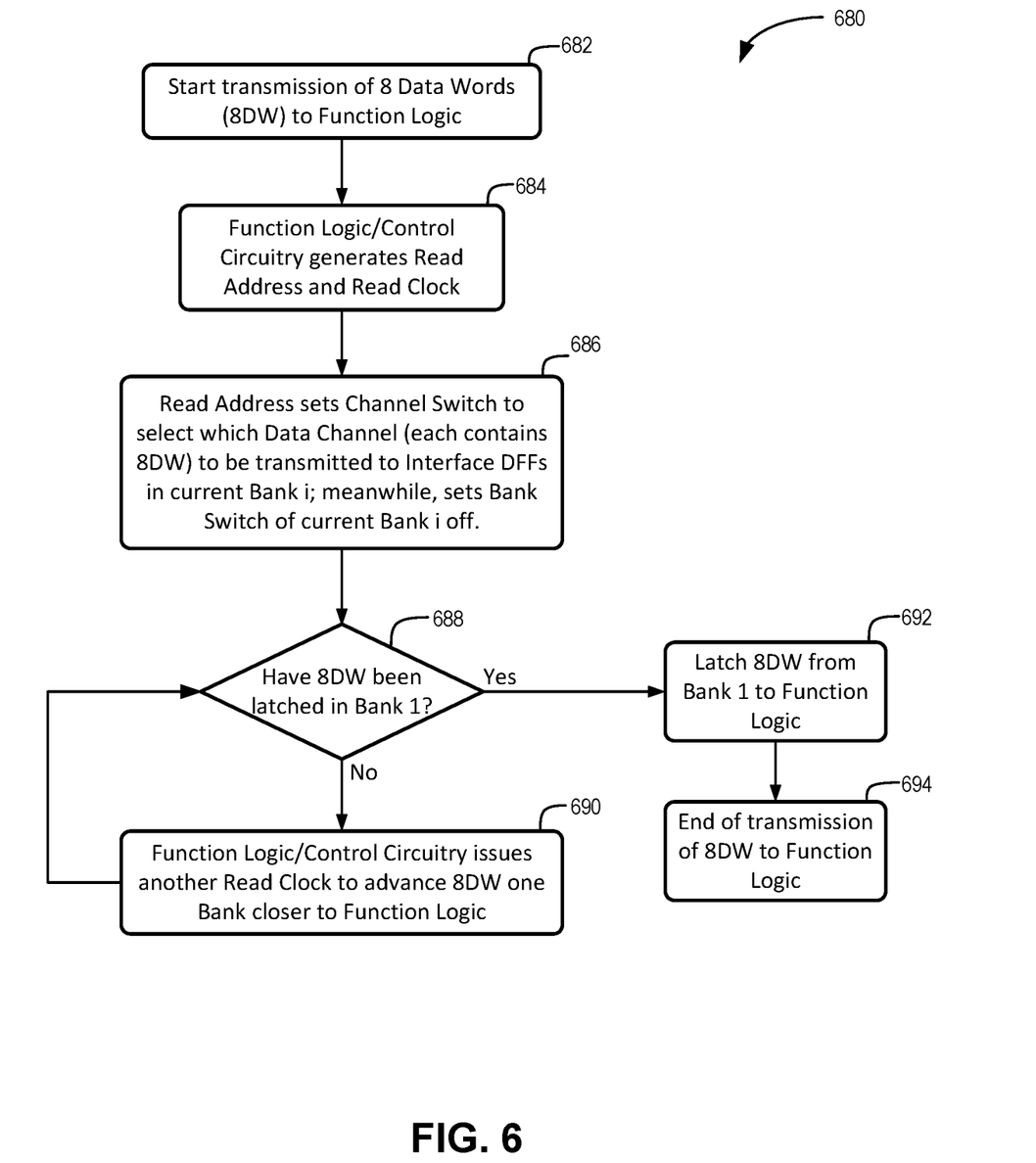
FIG. 6 is an illustrative flow chart 680 in accordance with an embodiment of the present disclosure.

FIG. 6 is an illustrative flow chart 680 in accordance with an embodiment of the present disclosure. The flow chart 680 may illustrate the selection and propagation of eight data words from a channel of a bank to function logic, such as the function logic 110 and/or 210. The flow chart may begin at process block 682, which includes start transmission of eight data words to the function logic.

The process block 682 may be followed by process block 684, which includes the function logic or control circuitry generating read address and read clock signals. The read address signal may be provided to a plurality of banks, such as banks 212, via a read address line, which may include a plurality of delays 216. The read clock signal may be provided to the plurality of banks via a read clock line, which may also include a plurality of delays 214. In some embodiments, the read address signal may be provided before the read clock signal to account for any latency associated with a targeted bank to prepare the eight data words to be latched by associated interface DFFs 334.

The process block 684 may be followed by process block 686, which includes setting a channel switch 224 of the targeted bank (bank i, for example) to select a desired channel including the eight data words. The read address signal received by the targeted bank may be decoded by an address decoder 220 to select which channel of 16 different channels to couple to word bus 226. At the same time, turning off a bank switch 240 of the targeted bank (bank i) to prevent the interface D Flip-flop 228 of the upstream bank (bank i+1) from being connected to the word bus 226.

The process block 686 may be followed by process block 688, which determines whether the eight data words have been latched by bank_1. If however, the targeted bank is bank_1, then the outcome is YES, and process block 692 follows. If the targeted bank is not bank_1, then the outcome is NO, and process block 690 follows. Process block 690 includes the function logic providing an additional read clock signal to move the eight data words to a subsequent bank closer to the function logic 210. After the completion of process block 690, then process block 688 is repeated. The process blocks 688 and 690 may be repeated i times, where i designates the targeted bank (bank i), and until the eight data words have propagated through the banks of the data transmission circuit until reaching bank_1.

Once the outcome of process block 688 is YES, then process block 692 follows, which includes latching the eight data words into the function logic. At this time, process block 694 may follow, which includes ending the transmission of the eight data words to the function logic 210.

In one embodiment, if data transmission sequence of FIG. 4 is to be followed, the order of the channel image data to be transmitted starts with bank_1 first then bank_2 and on until bank_K. When the plurality of the channel image data (in the order of BiC1 through BiC16) of bank_i (i=2, . . . , K) is to be transmitted through a respective channel switch of the plurality of channel switches, the bank switch of bank_i is turned off to block bank_i+1 from sharing its data on the word bus of the current bank, bank_i, and the bank switches of bank_i−1 through bank_1 are all turned on to enable word bus transmissions of image data from bank_i to its function logic destination.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A data transmission circuit of an image sensor, the data transmission circuit comprising:
   a plurality of transmission banks coupled in series with a first transmission bank coupled to function logic, wherein each of the plurality of transmission banks are coupled to a subsequent transmission bank in a direction toward the function logic to provide image data in response to a clock signal, and wherein each transmission bank comprises:
      a plurality of analog-to-digital converters (ADCs) coupled to receive analog image data from a respective pixel and convert the analog image data into digital image data,
      an address decoder coupled to receive an address signal and decode the address signal into a channel switch control signal and a bank switch control signal, wherein the address signal is delayed a number of times determined by the order of sequence of the respective transmission bank in relation to the function logic,
      a word bus,
      an interface latch coupled to the word bus to receive the digital image data and to provide the image data to a subsequent transmission bank in the direction toward the function logic in response to the clock signal received by the interface latch, and
      a plurality of channels coupled to the plurality of ADCs to receive the digital image data, wherein each channel is coupled to receive channel image data from the respective ADCs of the plurality of ADCs and provide the channel image data to the word bus through a channel switch in response to the channel switch control signal;
   a first plurality of delays coupled in series, wherein each delay of the first plurality of delays is associated with and coupled to a respective transmission bank of the plurality of transmission banks, and wherein the clock signal is received by each transmission bank after being delayed by a first respective number of delays of the first plurality of delays in relation to the function logic; and
   a second plurality of delays coupled in series, wherein each delay of the second plurality of delays is associated with and coupled to a respective transmission bank of the plurality of transmission banks, and wherein an address signal is provided to each transmission bank after being delayed by a second respective number of delays.

2. The data transmission circuit of claim 1, wherein each transmission bank further comprises a bank switch coupled to receive image data from another transmission bank in a direction away from the function logic, and provide the image data from the another transmission bank to the word bus in response to the bank switch control signal received by the bank switch.

3. The data transmission circuit of claim 2, wherein the bank switch is one of a conventional solid state transistor and a transmission gate.

4. The data transmission circuit of claim 1, wherein the address signal determines a channel of image data of each transmission bank of the plurality of transmission banks to provide to the function logic.

5. The data transmission circuit of claim 1, wherein the address signal determines a channel of image data of at least one of transmission bank of the plurality of transmission banks to provide to the function logic.

6. The data transmission circuit of claim 1, wherein the clock signal causes image data from at least one transmission bank of the plurality of transmission banks to propagate through intervening transmission banks between the at least one transmission bank and the function logic.

7. The data transmission circuit of claim 1, wherein each transmission bank further comprises a sense amplifier coupled between the word bus and the interface latch.

8. The data transmission circuit of claim 1, wherein each channel further comprises a channel buffer coupled between the respective ADCs of the plurality of ADCs and the channel switch.

9. The data transmission circuit of claim 1, wherein the channel switch is one of a conventional solid state transistor and a transmission gate.

10. An imaging system, comprising:
    an array of pixels coupled to receive image light and provide image data in response;
    a control circuitry coupled to the array of pixel; and
    readout circuitry coupled to the array of pixel and to receive the image data, and provide the image data to function logic, wherein the readout circuitry comprises:
       a plurality of transmission banks coupled in series with a first transmission bank coupled to function logic, wherein each transmission bank is coupled to receive image data in parallel from a plurality of pixels of the pixel array and provide the image data to the function logic in series in response to a clock signal, and wherein each transmission bank comprises:
          a plurality of analog-to-digital converters (ADCs) coupled to receive analog image data from a respective pixel and convert the analog image data into digital image data,
          an address decoder coupled to receive an address signal and decode the address signal into a channel switch control signal and a bank switch control signal, wherein the address signal is delayed a number of times determined by the order of sequence of the respective transmission bank in relation to the function logic,
          a word bus,
          an interface latch coupled to the word bus to receive digital image data and to provide the image data to a subsequent transmission bank in the direction toward the function logic in response to the clock signal received by the interface latch, and
          a plurality of channels coupled to receive the digital image data from the plurality of ADCs, wherein each channel is coupled to receive channel image data from the respective ADCs of the plurality of ADCs and provide the channel image data to the word bus through a channel switch in response to the channel switch control signal;
       a first plurality of delays coupled in series, wherein each delay of the first plurality of delays is associated with and coupled to a respective transmission bank of the plurality of transmission banks, and wherein the clock signal is received by each transmission bank after being delayed by the first respective number of delays of the plurality of delays in relation to the function logic; and
       a second plurality of delays coupled in series, wherein each delay of the second plurality of delays is associated with and coupled to a respective transmission bank of the plurality of transmission banks, and wherein an address signal is provided to each transmission bank after being delayed by the second respective number of delays.

11. The imaging system of claim 10, wherein there are K transmission banks coupled in series with the Kth transmission bank farthest from the function logic, and wherein there are K delays coupled to provide the clock signal to the K transmission banks, with each transmission bank receiving the clock signal after it has propagated through a commensurate number of delays.

12. The imaging system of claim 10, wherein each transmission bank further comprises a bank switch coupled to receive image data from another transmission bank in a direction away from the function logic, and provide the image data from the another transmission bank to the word bus in response to the bank switch control signal received by the bank switch, and wherein the bank switch is one of a conventional solid state transistor and a transmission gate.

13. The data transmission circuit of claim 10, wherein the address signal determines a channel of image data of each transmission bank of the plurality of transmission banks to provide to the function logic.

14. The data transmission circuit of claim 10, wherein the address signal determines a channel of image data of at least one of transmission bank of the plurality of transmission banks to provide to the function logic.

15. The data transmission circuit of claim 10, wherein the clock signal causes image data from at least one transmission bank of the plurality of transmission banks to propagate through intervening transmission banks between the at least one transmission bank and the function logic.

16. The data transmission circuit of claim 10, wherein each transmission bank further comprises a sense amplifier coupled between the word bus and the interface latch.

17. The data transmission circuit of claim 10, wherein each channel further comprises a channel buffer coupled between the respective ADCs of the plurality of ADCs and the channel switch.

18. The data transmission circuit of claim 10, wherein the channel switch is one of a conventional solid state transistor and a transmission gate.

19. A method, comprising:
providing an address signal and a clock signal to a plurality of banks of a data transmission circuit, wherein the plurality of banks are coupled in series with a first one of the plurality of banks coupled to function logic;
decoding the address signal by each of the plurality of banks to determine which of the plurality of banks is a targeted bank;
decoding the address signal by each of the plurality of banks to determine which of the plurality of channels is a targeted channel;
turning on a channel switch of the targeted channel by the targeted bank to direct channel image data to the interface latch of the targeted bank and turning off a bank switch of the targeted bank during the same time period, wherein the channel image data is the image data associated with the targeted channel;
latching the channel image data by an interface latch of the targeted bank in response to a rising edge of the clock signal, wherein the clock signal is received by the targeted bank after being delayed by a plurality of delays commensurate with the targeted bank; and
continuing to provide the clock signal to the plurality of banks, wherein each subsequent rising edge of the clock signal causes the channel image data to propagate to a subsequent bank in the direction toward the function logic.

20. The method of claim 19, wherein latching the channel image data by the interface latch of the targeted bank provides the channel image data to a subsequent bank of the plurality of banks, wherein the subsequent bank is in a direction toward the function logic.

21. The method of claim 20, further comprising:
receiving a subsequent rising edge of the clock signal at an interface latch of the subsequent bank; and
latching the channel image data by the interface latch of the subsequent bank in response to the subsequent rising edge of the clock signal.

22. The method of claim 21, wherein the rising edge of the subsequent clock signal received by the subsequent interface latch is delayed less than the rising edge of the clock signal received by the interface latch.

23. The method of claim 19, further comprising:
determining whether the channel image data has been latched by the function logic;
based on the channel image data not have yet been latched by the function logic, continuing to provide the clock signal; and
based on the channel image data being latched by the function logic, ceasing to provide the clock signal.

24. The method of claim 19, further comprising:
turning on respective bank switches of the previously targeted plurality of banks to pass the channel image data from an output of the interface latch of the targeted bank to the inputs of respective interface latches of the previously targeted plurality of banks in a direction toward the function logic.

* * * * *